US006630556B2

(12) United States Patent
Tomida et al.

(10) Patent No.: US 6,630,556 B2
(45) Date of Patent: Oct. 7, 2003

(54) METAL COMPOSITION FOR MAKING CONDUCTIVE FILM, METAL COMPOSITION FOR MAKING ELECTRON EMISSION ELEMENT, AND METHOD FOR MAKING ELECTRON EMISSION ELEMENT AND IMAGE FORMING APPARATUS USING THE SAME

(75) Inventors: Yasuko Tomida, Kanagawa (JP); Taku Shimoda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/115,090

(22) Filed: Apr. 4, 2002

(65) Prior Publication Data

US 2003/0054093 A1 Mar. 20, 2003

(30) Foreign Application Priority Data

Apr. 17, 2001 (JP) ....................................... 2001-117809

(51) Int. Cl.[7] ................................................ C08F 26/08
(52) U.S. Cl. .................... 526/264; 526/317.1; 313/483; 313/494
(58) Field of Search .............................. 526/264, 317.1; 313/483, 494

(56) References Cited

U.S. PATENT DOCUMENTS 6,123,876 A 9/2000 Kobayashi et al. ...... 252/519.2
2002/0015800 A1 2/2002 Miyamoto et al. .......... 427/553

FOREIGN PATENT DOCUMENTS

JP 8-277294 10/1996
JP 9-185940 7/1997
JP 10-326559 12/1998

OTHER PUBLICATIONS

M.I. Elinson et al., "The Emission of Hot Electrons and the Field Emission of Electrons from Tin Oxide," *Radio Engineering and Electronic Physics* 1290–1296 (1965).
G. Dittmer, "Electrical Conduction and Electron Emission of Discontinuous Thin Films," 9 *Thin Solid Films* 317–328 (1972).
M. Hartwell et al., "Strong Electron Emission from Patterned Tin–Indium Oxide Thin Films," *International Electron Devices Meeting* 519–521 (1975).
Hisashi Araki et al., "Electroforming and Electron Emission of Carbon Thin Films," 26(1) *Shinku* 22–29 (1983).

*Primary Examiner*—Helen L. Pezzuto
(74) *Attorney, Agent, or Firm*—Fitzpatrick, Cella, Harper & Scinto

(57) ABSTRACT

The present invention provides a metal composition for making a conductive film and a metal composition for making an electron emission element. The metal composition includes a vinylpyrrolidone-acrylic acid copolymer represented by formula (I):

(I)

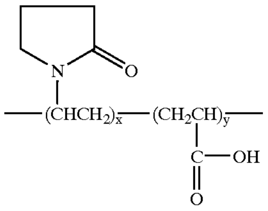

wherein x and y are integers. The present invention also provides a method for making an electron emission element having a conductive film for emitting electrons, the method comprising the steps of providing the metal composition containing the vinylpyrrolidone-acrylic acid copolymer represented by formula (I) above on a substrate and baking the metal composition.

11 Claims, 6 Drawing Sheets

METAL COMPOSITION FOR MAKING CONDUCTIVE FILM, METAL COMPOSITION FOR MAKING ELECTRON EMISSION ELEMENT, AND METHOD FOR MAKING ELECTRON EMISSION ELEMENT AND IMAGE FORMING APPARATUS USING THE SAME

BACKGROUND OF THE INVENTION

1. Field of the Invention

The present invention relates to a metal composition for making a conductive film, a metal composition for making an electron emission element, and a method for making the electron emission element and an image forming apparatus using the same.

2. Description of the Related Art

As a cold-cathode electron source, a surface-conduction electron emission element has been known. The surface-conduction electron emission element utilizes the effect of electron emission induced when electric current flows into a small thin film formed on a substrate in a direction parallel to the surface of the film. Examples of the surface-conduction electron emission elements include an element using a $SnO_2$ thin film made by Elinson et al., [M. I., Elinson, Radio Eng. Electron Pys., 10 (1965)], an element using a Au thin layer [G. Dittmer: “Thin Solid Films”, 9,317 (1972)], an element using an $In_2O_3/SnO_2$ thin film [M. Hartwell and C. G. Fonstad:“IEEE Trans. ED Conf.”, 519 (1975)], and an element using a carbon thin film [Hisashi Araki, et al., Shinku, Vol. 26, No. 1, p. 22 (1983)].

With reference to FIG. 6, the configuration of the above-described emitter made by M. Hartwell is described as a typical configuration of a surface-conduction electron emission element. As shown in FIG. 6, the element includes an insulative substrate 1 and a thin film 4 comprising an electron emission section. The electron emission section is made by an electrification process called “forming” described below.

In a typical surface-conduction electron emission element, an electron emission section is formed by subjecting a thin film for forming the electron emission section to an electrification process called “forming” prior to electron emission. The process of forming includes applying a voltage to the two ends of the thin film 4 using electrodes 2 so as to locally destroy, deform, or degenerate the thin film 4, thereby making an electron emission section having a high electrical resistance. In some cases, a crack would be generated in the thin film during forming, and the vicinity of the crack would function as the electron emission section.

The surface-conduction electron emission element subjected to the above forming process emits electrons from the above-described electron emission section when an electric current flows into the surface of the element by applying a voltage to the thin film 4 comprising the electron emission section.

The thin film 4 including the electron emission section comprises a conductive thin film made by depositing a conductive material on the insulative substrate 1. In a known manufacturing method, the thin film 4 is directly formed on the insulative substrate by deposition such as vacuum evaporation or sputtering of a conductive material. As a less expensive method for making a thin film without using a vacuum apparatus, a thin-film manufacturing method using an inkjet method has been suggested. A water-soluble organic metal compound for preparing an aqueous metal composition and a metal composition for preparing a thin film of excellent quality suitable for the above-described inkjet method are disclosed in Japanese Patent Laid-Open Nos. 8-277294 and 9-185940, respectively.

Furthermore, in order to uniformly form a conductive thin film at a predetermined position of a substrate, a method of preliminarily treating the surface of the substrate has been suggested in Japanese Patent Laid-Open No.10-326559.

In the above methods for forming a conductive thin film using an aqueous organic metal compound and metal composition, desired conductive films are not always formed due to the surface conditions of the substrates on which the metal composition lands, thereby failing to stably provide high-quality elements. Especially, when the substrate surface is preliminarily subjected to water-repellent finishing and thus has a small surface energy, the poor wettability to the metal composition sometimes causes difficulty in manufacturing the conductive thin film.

SUMMARY OF THE INVENTION

Accordingly, it is an object of the present invention to provide a metal composition for making a high-quality conductive film.

Another object of the present invention is to provide a metal composition for preparing high-quality conductive film on a surface of a substrate which is subjected to a water-repellent finishing and thus has a small surface energy.

Yet another object of the present invention is to provide a method for making an electron emission element and an image forming apparatus by using the above metal composition.

To achieve these goals, an aspect of the present invention provides a metal composition for making a conductive film, comprising a vinylpyrrolidone-acrylic acid copolymer represented by formula (I):

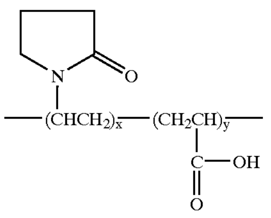

(I)

wherein x and y are integers.

Another aspect of the present invention provides a metal composition for making an electron emission element, comprising the vinylpyrrolidone-acrylic acid copolymer represented by above formula (I).

Another aspect of the present invention provides a method for making an electron emission element comprising a conductive film for emitting electrons, the method comprising the steps of: providing a metal composition comprising the vinylpyrrolidone-acrylic acid copolymer represented by above formula (I) on a substrate; and baking the metal composition.

Another aspect of the present invention provides a method for making an electron emission element comprising a pair of electrodes opposing each other, and a conductive film disposed between the pair of electrodes, the method comprising the steps of: providing a metal composition comprising the vinylpyrrolidone-acrylic acid copolymer represented by above formula (I) on a region between the pair of electrodes disposed on the substrate; and baking the metal composition.

Yet another aspect of the present invention provides a method for making an image forming apparatus comprising an electron emission element and an image forming unit for forming images by electron irradiation. The electron emission element is made by any one of the methods described above.

Further objects, features and advantages of the present invention will become apparent from the following description of the preferred embodiments (with reference to the attached drawings).

DESCRIPTION OF THE PREFERRED EMBODIMENTS

Figure 1A:
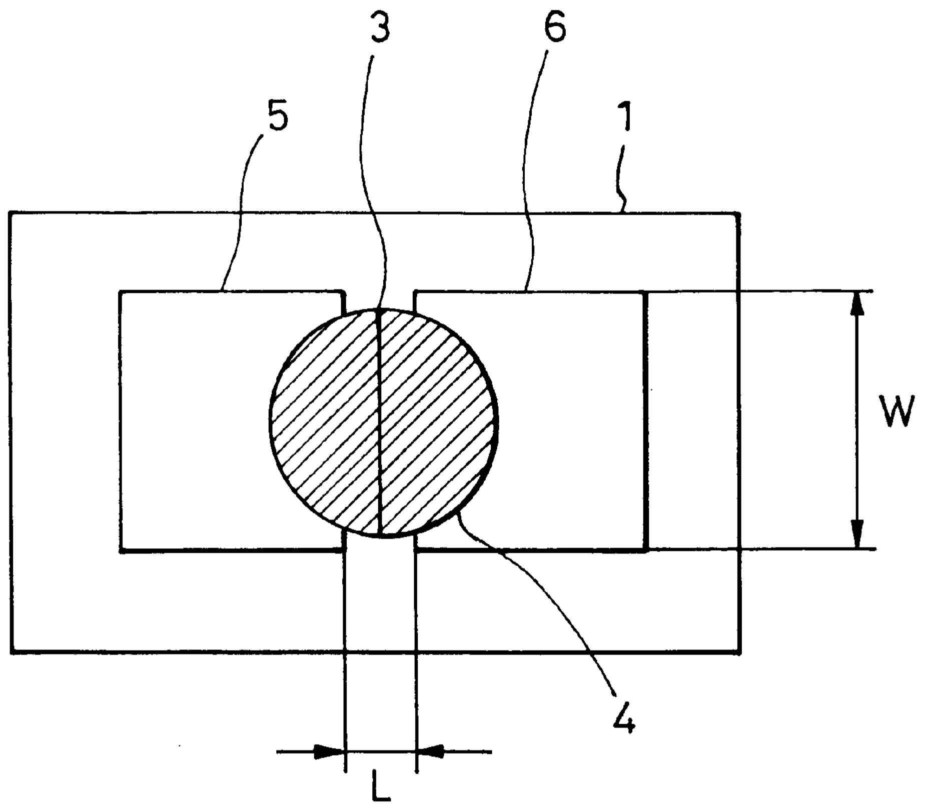
FIG. 1A is a schematic plan view showing the basic structure of a surface-conduction electron emission element made by a method of the present invention.

A metal composition for making a conductive film or a metal composition for making an electron emission element of the present invention contains a vinylpyrrolidone-acrylic acid copolymer represented by formula (I) below:

(I)

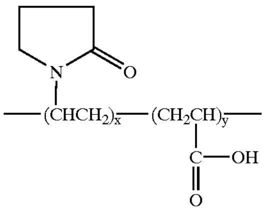

wherein x and y are integers.

Furthermore, the present invention provides a method for making the electron emission element comprising a conductive film for emitting electrons, the method comprising the steps of: providing the metal composition comprising the vinylpyrrolidone-acrylic acid copolymer represented by formula (I) above on a substrate, and baking the metal composition.

The present invention also provides a method for making an electron emission element comprising a pair of electrodes opposing each other, and a conductive film disposed between the pair of electrodes, the method comprising the steps of: providing the metal composition comprising the above-described vinylpyrrolidone-acrylic acid copolymer represented by formula (I) on a region between the pair of electrodes disposed on the substrate, and baking the metal composition, The present invention also provides a method for making an image forming apparatus comprising an electron emission element and an image forming unit for forming images by electron irradiation, wherein the electron emission element is made by one of the above-described manufacturing methods.

The present invention will now be described in detail.

(Description of Metal Composition)

The metal composition for making a conductive film or the metal composition for making the electron emission element contains a vinylpyrrolidone-acrylic acid copolymer represented by formula (I):

(I)

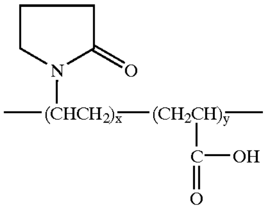

wherein x and y are integers.

No limit is imposed as to the types of the vinylpyrrolidone-acrylic acid copolymer represented by formula (I); however, the vinylpyrrolidone-acrylic acid copolymer preferably contains 50 weight percent or more and more preferably, 70 weight percent or more of the vinylpyrrolidone monomer unit. At a content of the vinylpyrrolidone monomer unit of less than 50 weight percent, the ratio of the acrylic monomer unit becomes relatively high, rendering a metal composition of high acidity which would affect the metal compound contained in the composition. On the other hand, if only the vinylpyrrolidone monomer units are contained, defective or uneven conductive thin films would result.

The average molecular weight of the vinylpyrrolidone-acrylic acid copolymer is preferably 30,000 or more, and more preferably, 50,000 or more. At an average molecular weight of less than 30,000, desirable thin films are not formed because of a low organization potency.

The metal composition of the present invention preferably contains 0.005 weight percent or more, and more preferably, 0.01 weight percent or more of the vinylpyrrolidone-acrylic acid copolymer. At a content of the vinylpyrrolidone-acrylic acid copolymer of less than 0.005 weight percent, defective conductive thin films would be formed. Especially, when the substrate surface is preliminarily subjected to water-repellent finishing and thus has a small surface energy, the poor wettability to the metal composition sometimes causes difficulty in making the conductive thin film.

The metal composition of the present invention contains a metal compound. The metal compound is preferably aqueous. Examples of metal compounds include halides, nitrates, nitrites, ammine complexes, organic ammine complexes, and amino acid complexes. Examples of the metal element include platinum group metals such as platinum, palladium, and ruthenium, gold, silver, copper, chromium, tantalum, iron, tungsten, lead, zinc, and tin. A platinum group element is particularly preferable.

The preferred range of the metal content in the metal composition of the present invention varies according to the type of metal compound used. Generally, the metal content by weight is in the range of 0.05 to 8%, and more preferably, 0.1 to 3%. At an excessively low metal content, a large amount of metal composition is necessary to deposit the desired amount of metal on the substrate. As a result, the time required to provide the metal composition on the substrate is extended, and undesirably large liquid pools are formed on the substrate surface, thereby failing to provide metals only on the desired positions of the substrate. At an excessively high metal content, the metal composition provided on the substrate forms uneven layers after the step of drying or baking. As a result, the conductive thin film at the electron emission section becomes uneven, and the characteristics of the electron emission element are degraded.

The metal composition of the present invention preferably contains a water-soluble polyhydric alcohol. Herein, polyhydric alcohol refers to a compound having a plurality of alcoholic hydroxyl groups in the molecule. A polyhydric alcohol of carbon number 2, 3, or 4, which is liquid at room temperature, is particularly preferable. Examples of such alcohols include ethylene glycol, propylene glycol, 1,3-propanediol, 3-methoxy-1,2-propanediol, 2-hydroxymethyl-1,3-propanediol, diethylene glycol, glycerin, and 1,2,4-butanetriol.

The content of the water-soluble polyhydric alcohol in the metal composition is preferably 5 weight percent or less, and more preferably, in the range of 0.05 to 3 weight percent. A content exceeding these ranges causes a delay in drying of the metal composition applied on the substrate surface and is thus not preferable.

Preferably, the metal composition of the present invention contains a water-soluble monohydric alcohol. The water-soluble monohydric alcohol preferably has a carbon atom number of 1 to 4 and is liquid at room temperature. Examples of the monohydric alcohol include methanol, ethanol, propanol, and 2-butanol.

The content of the water-soluble monohydric alcohol in the metal composition must be 35 weight percent or less. A content exceeding this range causes degradation in the solubility of the water-soluble organic metal compound. Also, when the metal composition is applied on a specified portion of the substrate, undesired spreading of the applied coat occurs, which results in difficulty in forming films on only specified portions of the substrate.

(Description of a Manufacturing Method)

A method for manufacturing the electron emission element of the present invention will now be described.

The method for manufacturing the electron emission element of the present invention having a conductive layer for emitting electrons comprises the steps of providing a metal composition comprising the above-described vinylpyrrolidone-acrylic acid copolymer represented by formula (I) on a substrate; and baking the metal composition.

The present invention also provides another method for making an electron emission element comprising a pair of electrodes opposing each other, and a conductive film disposed between said pair of electrodes, the method comprising the steps of: providing a metal composition comprising the above-described vinylpyrrolidone-acrylic acid copolymer represented by formula (I) on a region between the pair of electrodes disposed on the substrate; and baking the metal composition.

Any suitable technology can be used to provide the metal composition on the substrate. A technology using droplets of the metal composition is preferable. Any suitable means can be employed as long as droplets can be formed and can be provided on the substrate. An appropriate technology for this is an inkjet method since the method can effectively and accurately form micro droplets and can easily be controlled. Various types of inkjet methods are available, including a method of forming droplets by mechanical impacts applied by piezoelectric elements or the like and a Bubblejet (trademark) method of forming droplets by heating a liquid with micro heaters to jet bubbles. All of these methods can produce and provide micro droplets of approximately 10 nanograms to several tens of micrograms on the substrate with high reproducibility.

During the step of providing droplets on the substrate described above, one position on the substrate may be subjected to discharging droplets a plurality of times instead of once. A plurality of dischargings may be effected to provide the desired amount of metal composition on the substrate.

The metal composition provided on the substrate by the above-described technology is dried and baked to make conductive thin films. A suitable drying method such as in-air drying, circulating-air drying, heat drying, or the like can be employed during the drying step. The droplets can be dried by placing the substrate provided with the droplets in an electric drying machine at a temperature of 70 to 130° C. for 30 seconds to 2 minutes. The step of baking may be performed according to any suitable heating process. The baking temperature must be sufficiently high to decompose the metal compound and to produce inorganic micro particles; generally, the baking temperature is in the range of 150 to 500° C. The drying and the baking need not be performed separately but can be performed continuously in one step.

Figure 1B:
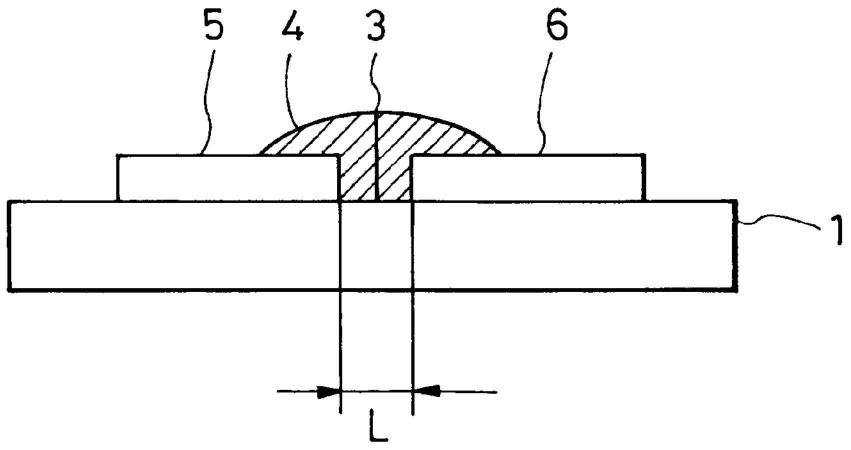
FIG. 1B is a cross-sectional view of the surface-conduction electron emission element shown in FIG. 1A.

FIG. 1A is a schematic plan view showing an embodiment of a surface-conduction electron emission element manufactured according to the present invention. FIG. 1B is a cross-sectional view of the surface-conduction electron emission element shown in FIG. 1A. The basic structure of the electron emission element manufactured according to the present invention will now be described with reference to FIGS. 1A and 1B. The surface-conduction electron emission element shown in FIGS. 1A and 1B includes a substrate 1, element electrodes 5 and 6, a conductive thin film 4, and an electron emission section 3.

The substrate 1 comprises glass, ceramic, or the like.

The element electrodes 5 and 6 are arranged to oppose each other and comprise a general conductor material. Examples of the conductor material are: a printed conductor comprising an elemental metal such as Ni, Cr, Au, Mo, W, Pt, Ti, Al, Cu, Pd or the like or an alloy of these, a metal such as Pd, Ag, Au, $RuO_2$, Pd—Ag, or the like or an oxide thereof, and glass; a transparent conductive material such as $In_2O_3$—$SnO_2$; and a semiconductor material such as polysilicon.

Various methods for manufacturing the above-described surface-conduction electron emission element are available. One example is shown in FIGS. 2A to 2D. The same components as those in FIG. 1 are represented by the same reference numerals.

Figure 2A:
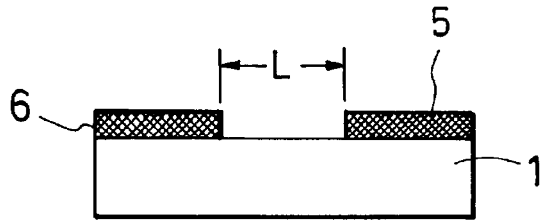
FIGS. 2A to 2D are diagrams for explaining steps of making the surface-conduction electron emission element of the present invention.

Step 1: The substrate 1 is thoroughly washed with a cleaning liquid, deionized water, and an organic solvent. Subsequently, an element electrode material is deposited by vacuum evaporation, sputtering or the like and the deposited material is subjected to photolithography to form the element electrodes 5 and 6 on the substrate 1, as shown in FIG. 2A.

Figure 2B:
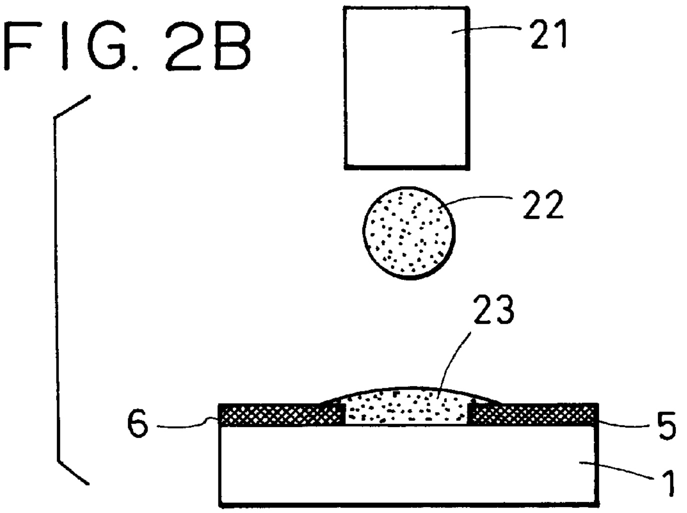
Figure 2C:
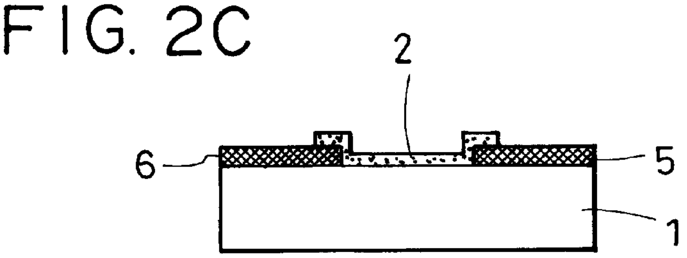

Step 2: The metal composition of the present invention is applied on the substrate 1 having the element electrodes 5 and 6 to form a coating. An inkjet method such as a piezo method or hot-bubbling method, i.e., the Bubblejet method (trademark), is employed to provide a droplet 22 on the substrate, as shown in FIG. 2B. Subsequently, the resulting coating is baked to decompose the organic component so as to form a thin film 2 for forming the electron emission section, as shown in FIG. 2C.

Figure 2D:
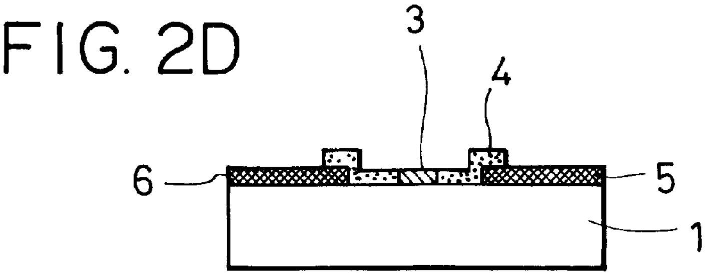

Step 3: Next, an electrification process known as electroforming is performed. Electric current is supplied between the element electrodes 5 and 6 from a power supply (not shown) so as to form the electron emission section 3 having a modified texture in the thin film 2, as shown in FIG. 2D.

Figure 3:
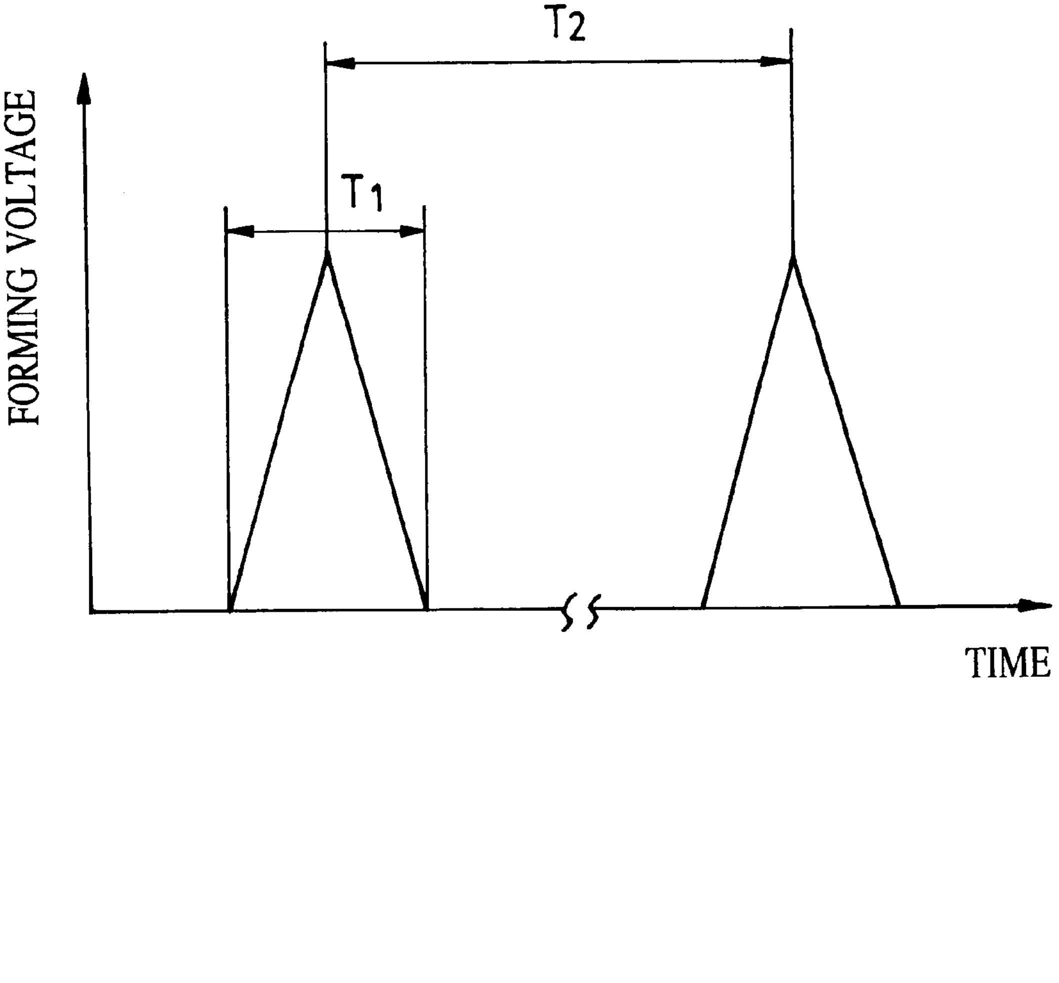
FIG. 3 is a graph showing a voltage waveform of a preferred electroforming of the present invention.

An example of a voltage waveform of the electro-forming is illustrated in FIG. 3. In FIG. 3, T1 represents the pulse width and T2 represents the pulse interval of the voltage waveform. T1 is controlled from 1 microsecond to 10 millisecond, T2 is controlled from 10 microseconds to 100 milliseconds, and the peak value of a triangular wave, i.e., the peak voltage during electro-forming, is suitably selected according to the type of surface-conduction electron emission element. Under these conditions, a voltage is applied for several seconds to several tens of minutes under a suitable degree of vacuum. The waveform applied between the element electrodes 5 and 6 is not limited to triangular waves. Any other suitable waveform, such as a rectangular waveform, may be used.

The electro-forming ends when the resistance of the emitter reaches a predetermined value. The resistance of the emitter is measured by applying a sufficiently small voltage so as not to locally destruct or deform the conductive thin film 4, for example, a voltage of about 0.1 V, during the pulse interval T2.

Step 4: Next, the surface-conduction electron emission element after completion of the electro-forming is subjected to a process known as an activation process. The activation process includes introducing an organic gas such as acetone, benzonitrile, tolunitrile, or the like for about $1.3\times10^{-4}$ Pa ($10^{-6}$ Torr) and repeating pulse application to deposit carbonaceous compounds. As in the electro-forming process, the peak value of the pulse wave is maintained at a low level. The activation process ends when the element current $I_f$ is saturated.

Step 5: The resulting surface-conduction electron emission element is placed in a vacuum higher than that during the electro-forming process and the activation process, and is operated therein.

(Description of Image Forming Apparatus)

An image forming apparatus of the present invention will now be described.

The image forming apparatus comprises a substrate and a plurality of the surface-conduction electron emission elements prepared according to the present invention arranged on the substrate.

An example of arrangement is a simple matrix arrangement. In a simple matrix arrangement, a number n of leads extending in the Y direction, hereinafter referred to as "vertical leads", are arranged on a number m of leads extending in the X direction, hereinafter referred to as "horizontal leads", with an intermediate insulating layer therebetween, and two element electrodes of each surface-conduction electron emission element are connected to a corresponding horizontal lead and to a corresponding vertical lead, respectively.

With the surface-conduction electron emission elements of the present invention arranged in the simple matrix, at a voltage beyond a threshold voltage, the emitted electrons are controlled by the peak value and the width of the pulse voltage applied between the element electrodes arranged to oppose each other. At the threshold voltage or less, electron emission barely occurs. Because of these characteristics, selecting a surface-conduction electron emission element in response to an input signal so as to control the amount of electron emission of that element is possible by suitably applying the above-described pulse voltage to individual elements.

Figure 4:
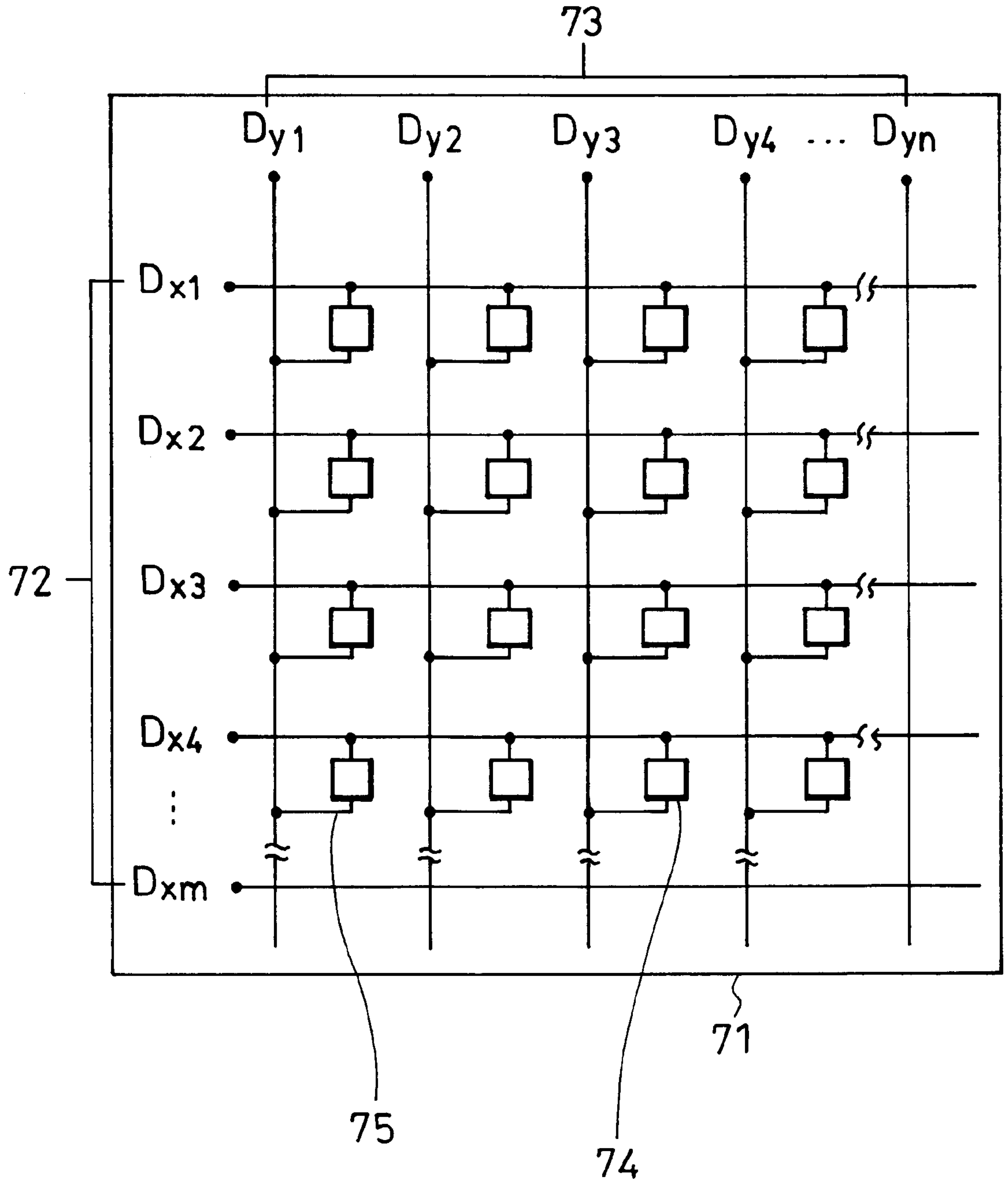
FIG. 4 is an electron source arranged in a simple matrix.

In FIG. 4, an electron source substrate 71 comprises glass or the like, as described above. The number of surface-conduction electron emission elements formed thereon and the shape and design of each element are suitably adjusted according to usage.

A number m of horizontal leads 72 extending in the X direction include $D_{X1}$, $D_{X2}$, . . . and $D_{Xm}$ and are formed by vacuum deposition, printing, sputtering, or the like using a conductive metal. The material, the film thickness, and the width of the leads are adjusted so as to uniformly apply a voltage to many surface-conduction electron emission elements. Vertical leads 73 extending in the Y direction comprise a number n of leads including $D_{Y1}$, $D_{Y2}$, . . . $D_{Yn}$, and are formed by the same process as the horizontal leads 72. Between the number m of the horizontal leads 72 and the number n of the vertical leads 73, an intermediate insulating layer is disposed so that these leads are electrically isolated from each other to form a matrix. The intermediate insulating layer is not shown in the drawing. The numbers m and n are positive integers.

The intermediate insulating layer not shown in the drawing comprises $SiO_2$ or the like and is formed by vacuum deposition, printing, sputtering, or the like. The intermediate insulating layer is formed on a part or the entire surface of the substrate 71 provided with the horizontal leads 72 into a predetermined shape, and the material, the film thickness, and the method of formation are suitably adjusted to withstand a potential difference at the intersections between the horizontal leads 72 and the vertical leads 73. The horizontal leads 72 and vertical leads 73 also function as external terminals.

The two opposing electrodes (not shown) of each surface-conduction emitter 74 are electrically connected to the corresponding horizontal lead 72 and the corresponding vertical lead 73, respectively, via connections 75 composed of a conductive metal formed by vacuum deposition, printing, sputtering, or the like.

The horizontal leads 72 are electrically connected to a scan signal generator (not shown) for supplying a scan signal for scanning rows of the surface-conduction emitters 74 aligned in the X direction according to an input signal.

The vertical leads 73 are electrically connected to a modulation signal generator, not shown in the drawing, for supplying a modulation signal to columns of the surface-conduction electron emission elements aligned in the Y direction.

The drive voltage applied to each of the surface-conduction electron emission elements is a difference voltage between the scan signal and the modulation signal.

According to the above structure, elements can be easily and independently controlled by merely using a simple matrix arrangement.

Figure 5:
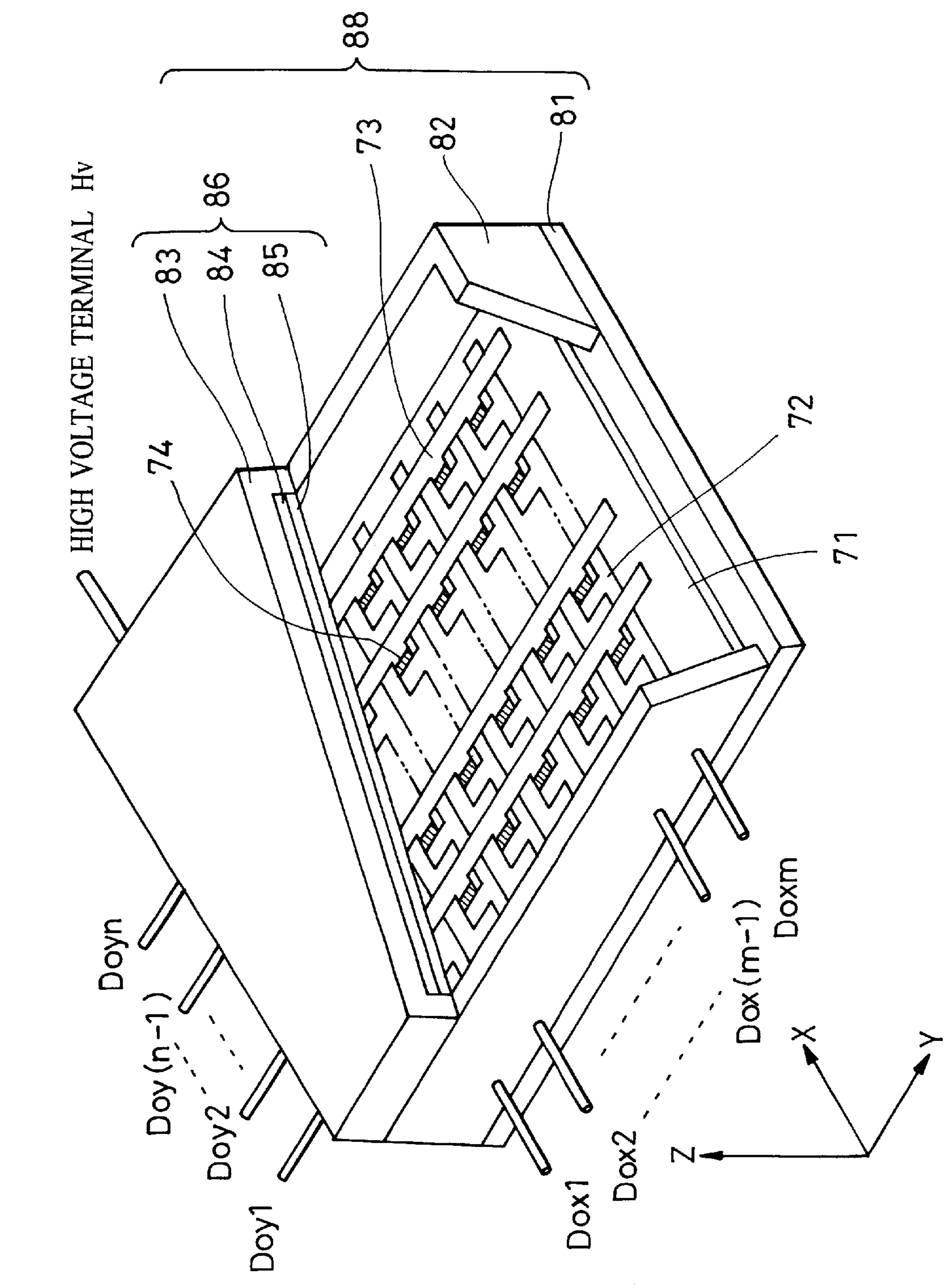
FIG. 5 is a schematic diagram showing the structure of a display panel for an image forming apparatus.
Figure 6:
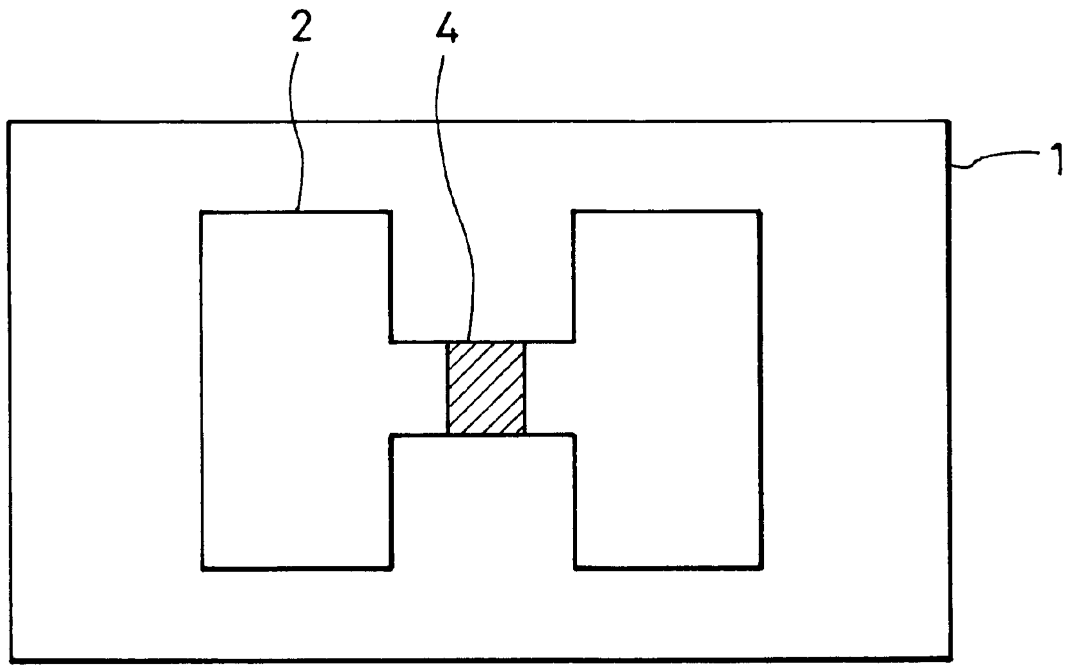
FIG. 6 is a diagram showing a known surface-conduction electron emission element.

Next, an image forming apparatus using the electron source arranged in a simple matrix as above is explained with reference to FIG. 5. FIG. 5 is a diagram illustrating the basic structure of the image forming apparatus.

Referring to FIG. 5, the image forming apparatus comprises the above-described electron source substrate 71 having the electron emission elements, a rear plate 81 for fixing the electron source substrate 71, a face plate 86, and a supporting frame 82. The face plate 86 comprises a glass substrate 83, a fluorescent film 84, and a metal back 85, the latter two being formed on the inner surface of the glass substrate 83. The rear plate 81, the supporting frame 82, and the face plate 86 are coated with frit glass or the like and baked in a nitrogen atmosphere for 10 minutes at a temperature of 400 to 500° C. to provide sealing, thereby making a package 88.

In FIG. 5, the component represented by reference numeral 74 corresponds to the electron emission section shown in FIG. 1. Two element electrodes of each surface-conduction electron emission element are electrically connected to the horizontal lead 72 extending in the X direction and the vertical lead 73 extending in the Y direction.

Although the above-described package 88 comprises the face plate 86, the supporting frame 82, and the rear plate 81, the rear plate 81 is provided to mainly reinforce the strength of the substrate 71. When the substrate 71 has sufficient strength, no rear plate 81 is necessary and the package 88 may comprise the substrate 71, the face plate 86, and the supporting frame 82 directly bonded to the substrate 71. Alternatively, a support called a "spacer" may be disposed between the face plate 86 and the rear plate 81 so as to give the package 88 sufficient strength to withstand ambient pressures.

The present invention provides an image forming apparatus suitable for a display device in television broadcasting, video conference, and computers. The image forming apparatus of the invention can also be applied to optical printers comprising photosensitive drums.

EXAMPLES

The present invention will now be described by way of examples. The examples below by no means limit the scope of the invention.

Example 1

Example 1 of a method for preparing a metal composition for making an electron emission element is now described.

Water was added to 2.0 g of tetramonoethanolamine palladium acetate, 0.2 g of a vinylpyrrolidone-acrylic acid copolymer having an average molecular weight of 30,000 and containing 50 weight percent of the vinylpyrrolidone monomer unit, 1.0 g of ethylene glycol, and 15 g of, 2-propanol to prepare a solution having a total weight of 100 g. The solution was filtered using a membrane filter having a pore size of 0.22 μm to obtain a metal composition.

Next, a soda-lime glass substrate was cleaned by ashing in $O_3$, and then left to stand in a desiccator using silica gel as a desiccant for 48 hours to prepare a substrate 101 for holding the metal composition. Another soda-lime glass substrate was left to stand in a container charged with dimethylethoxysilane vapor for 90 minutes. The substrate was then discharged from the container and was baked using a hot-plate at a temperature of 150° C. for 15 minutes to prepare a substrate 102 for carrying the metal composition.

The above-described metal composition was loaded into a Bubblejet (trademark) printer head BC-01 (manufactured by Canon Inc.). A direct-current voltage of 20 V was applied to predetermined heaters in the head from an external source for 7 microseconds so as to allow droplets to be discharged. The discharged droplets formed fifty dots of the metal composition on each of the substrates 1 and 2 and were baked at a temperature of 350° C. for 30 minutes to form conductive thin films.

The resulting conductive films were observed using an optical microscope. Both the substrates 101 and 102 had 50 conductive thin films of excellent quality thereon. The average diameter of the dots of the semiconductive thin films formed thereon was 80 μm on the substrate 101 and 75 μm on the substrate 102.

Comparative Example 1

A metal composition was prepared as in Example 1 but without the vinylpyrrolidone-acrylic acid copolymer.

Fifty dots of the resulting metal composition were formed on each of the substrates 101 and 102 as in Example 1 and were observed using an optical microscope. No conductive thin films were formed on either substrate 101 or 102, but small scattered conductive compounds having an average diameter of 15 μm were observed.

Example 2

The metal composition of Example 1 was stored for 1 week at a temperature of 30° C. to examine the stability. Neither discoloration nor precipitated particles were visually observed. The stability of the metal composition was excellent.

Example 3

A metal composition was prepared as in Example 1 but with a vinylpyrrolidone-acrylic acid copolymer containing 30 weight percent of the vinylpyrrolidone monomer unit.

The stability of the resulting metal composition was examined as in Example 2. The metal composition discolored to a rather brownish color and black metal deposits were observed.

Example 4

Another method for preparing a metal composition for making an electron emission element is described below as Example 4.

Water was added to 2.0 g of ethylenediamine palladium acetate, 0.1 g of a vinylpyrrolidone-acrylic acid copolymer having an average molecular weight of 50,000 and containing 60 weight percent of the vinylpyrrolidone monomer unit, 1.0 g of ethylene glycol, and 25 g of ethanol to prepare a palladium compound solution having a total weight of 100 g. The solution was filtered using a membrane filter having a pore size of 0.22 μm to obtain a metal composition.

The resulting metal composition was formed into 50 dots on each of the substrates 101 and 102 as in Example 1 and was observed using an optical microscope. Both the substrates 101 and 102 had 50 conductive thin films of excellent quality thereon. The average diameter of the dots of the semiconductive thin films formed thereon was 85 μm on the substrate 101 and 80 μm on the substrate 102.

Comparative Example 2

A metal composition was prepared as in Example 4 but without the vinylpyrrolidone-acrylic acid copolymer.

Fifty dots of the resulting metal composition were formed on each of the substrates 101 and 102 as in Example 1 and were observed using an optical microscope. No conductive thin films were formed on either substrate 101 or 102, but small scattered conductive compounds having an average diameter of 15 μm were observed.

Example 5

Water was added to 2.0 g of a palladium complex of proline, 0.05 g of a vinylpyrrolidone-acrylic acid copolymer having an average molecular weight of 90,000 and containing 70 weight percent of the vinylpyrrolidone monomer unit, and 20 g of 2-propanol to prepare a solution having a total weight of 100 g. The solution was filtered using a membrane filter having a pore size of 0.22 μm to obtain a metal composition.

The resulting metal composition was loaded into a discharge head of a piezojet printer FP 510 (manufactured by Canon Inc.). A direct-current voltage of 30 V was applied from an external source for 5 microseconds so as to allow droplets to be discharged. The dots were observed using an optical microscope. Both the substrates 101 and 102 held 50 conductive thin films of excellent quality. The average diameter of the dots of the semiconductive thin films formed thereon was 80 $\mu$m on the substrate 101 and 75 $\mu$m on the substrate 102.

Comparative Example 3

A metal composition was prepared as in Example 5 but without the vinylpyrrolidone-acrylic acid copolymer.

The resulting metal composition was formed into 50 dots on each of the substrates 1 and 2 as in Example 5 and was observed using an optical microscope. Conductive films were not formed on either the substrate 101 or the substrate 102. Only small conductive compounds having an average diameter of 15 $\mu$m were formed thereon.

Example 6

A metal composition was prepared as in Example 5 but with a vinylpyrrolidone-acrylic acid copolymer having an average molecular weight of 10,000.

The resulting metal composition was formed into 50 dots on each of the substrates 1 and 2 as in Example 5 and was observed using an optical microscope. The substrate 101 held 45 dots of excellent quality having an average diameter of 55 $\mu$m. The remaining 5 dots did not form conductive thin films and had small scattered conductive compounds having an average diameter of 27 $\mu$m. The substrate 102 held 42 dots of excellent quality having an average diameter of 50 $\mu$m. The remaining 8 dots did not form conductive thin films and had small scattered conductive compounds having an average diameter of 23 $\mu$m.

Comparative Example 4

A metal composition was prepared as in Example 5 except that polyvinylpyrrolidone having an average molecular weight of 50,000 was used instead of the vinylpyrrolidone-acrylic acid copolymer.

The metal composition was formed into 50 dots on each of the substrates 101 and 102 as in Example 5 and was observed using an optical microscope. The substrate 101 held 38 dots of conductive thin films having an average diameter of 55 $\mu$m. The remaining 12 dots did not form conductive thin layers but had small scattered conductive compounds having an average diameter of 22 $\mu$m. The above 38 dots lacked planar uniformity and resulted in defective films. The substrate 102 held 40 dots of excellent quality having an average diameter of 47 $\mu$m. The remaining 10 dots did not form conductive thin films but had small scattered conductive compounds having an average diameter of 20 $\mu$m.

Example 7

An electron emission element having the structure shown in FIGS. 1A and 1B was prepared as Example 7. FIG. 1A is a plan view of the electron emission element and FIG. 1B is a cross-sectional view of the electron emission element. Referring to FIGS. 1A and 1B, the electron emission element included the insulative substrate 1, element electrodes 5 and 6 for applying a voltage to the emitter, a thin film (conductive thin film) 4, and the electron emission section 3 included in the thin film 4. In the drawing, the distance between the element electrodes 5 and 6 is represented by L, and the width of the electrode is represented by W.

Referring to FIGS. 2A to 2D, a method for making the electron emission element of this Example is explained.

A glass plate was employed as the insulative substrate 1. After the insulative substrate 1 was thoroughly washed with an organic solvent, the element electrodes 5 and 6 were formed on the surface of the substrate 1 using platinum, as shown in FIG. 2A. The distance L between the electrodes was 10 $\mu$m, the width W of the element electrodes was 500 $\mu$m, and the thickness of the element electrodes was 100 Å.

The substrate 1 having the element electrodes 5 and 6 was subjected to ultrasonic cleaning using deionized water, washed with 80° C. hot water, and dried. Subsequently, the substrate 1 having the element electrodes 5 and 6 was left to stand in a container charged with dimethyldiethoxysilane vapor for 30 minutes, discharged from the container, and baked at a temperature of 120° C. for 15 minutes using a hot-plate.

The metal composition of Example 1 was loaded into a Bubblejet (trademark) printer head BC-01 (manufactured by Canon Inc.). A direct-current voltage of 20 V was applied to predetermined heaters in the head from an external source for 7 microseconds so as to allow droplets to be discharged, as shown in FIG. 2B. The discharged droplets were baked in air at a temperature of 350° C. for 15 minutes to decompose and deposit the metal compounds on the substrate so as to make the thin film 2 for making the electron emission section, as shown in FIG. 2C. The thin film 2 was observed using an optical microscope. The thin film 2 had conductive thin layers of excellent quality.

The resulting substrate 1 with the thin film 2 for making the electron emission section was placed in a predetermined vacuum container. After the container was exhausted to a sufficient vacuum, a voltage was applied between the element electrodes 5 and 6 using an external terminal so as to electrify the thin film 2 and form the electron emission section 3, as shown in FIG. 2D (the forming process). The voltage waveform during the forming process is shown in FIG. 3.

In FIG. 3, the pulse width and the pulse interval of the voltage waveform are represented by T1 and T2, respectively. In this example, T1 was 1 millisecond, T2 was 10 milliseconds, the peak value of the triangular wave, i.e., the peak voltage during the forming process, was 5 V, and the forming process was performed for 60 seconds.

Next, benzonitrile was introduced in the vacuum container at room temperature for approximately $1.3\times10^{-4}$ Pa, and an activation process was performed by applying a voltage between the element electrodes 5 and 6.

The electron emission characteristics of the prepared element were examined based on the element current $I_f$ and the emission current $I_e$ which flowed when an element voltage was applied between the electrodes 5 and 6. The electron emission characteristics were excellent.

A face plate having a fluorescent film and metal back, which serves as an anode, was placed in a vacuum apparatus and electrons were emitted from the electron source. Part of the fluorescent layer emitted light, and the intensity of the emission varied in response to the element current $I_f$. Thus, the emitter can also function as a light-emitting display element.

Example 8

A quartz glass plate was employed as the insulative substrate 1, and the element electrodes 5 and 6 were formed on the surface of the substrate 1 using platinum. The metal composition of Example 4 was loaded into a discharge head of a piezojet printer FP 510 (manufactured by Canon Inc.). A direct-current voltage of 30 V was applied from an external source for 5 microseconds so as to allow the palladium compound solution to land on the gap between the element electrodes 5 and 6 on the substrate 1. The resulting substrate was baked at 350° C. for 12 minutes to pyrolize the palladium compound and form palladium oxides. A predetermined electro-forming process and an activation process were performed as in Example 7. The electron emission characteristics of the resulting electron emission element were excellent.

Example 9

172,800 thin films for forming electron emission sections, which comprised palladium oxides prepared as in Example 8, were formed on a glass substrate in 240 rows by 720 columns. The thin films were connected in a matrix.

An image forming apparatus was made using the above-described plurality of thin films for forming the electron emission sections as follows. The glass substrate having the thin films for forming the electron emission sections was fixed on a rear plate, and a face plate comprising a fluorescent film and metal back was disposed 3 mm above the glass substrate with a supporting frame therebetween. Frit glass was applied to the junctions and was baked in air at a temperature of 400° C. for 10 minutes to seal the junctions, thereby making a glass casing.

Next, the interior of the resulting glass housing was exhausted via an exhaust pipe using a vacuum pump. After reaching an adequate degree of vacuum, a voltage was applied to each of the thin films for forming the electron emission sections using an external terminal connected to the connections arranged in the matrix so as to electrify the thin films (forming process) and form electron emission sections.

Subsequently, the exhaust pipe was welded in a vacuum of approximately $1.3 \times 10^{-4}$ Pa ($10^{-6}$ Torr) using a gas burner to hermetically seal the package. Thus, the image forming apparatus of the present invention was completed.

In the resulting image forming apparatus of the present invention, each electron emission element emits electrons by applying a voltage via an external terminal. A high voltage of several kV was applied from the high-voltage terminal to display images.

As described above, excellent conductive thin films can be manufactured using the metal composition for making a conductive film or the metal composition for making the electron emission element of the present invention. Excellent conductive thin films can be formed even on substrates subjected to water-repellent finishing, which have small surface energy. The preservation stability of the prepared metal composition is also excellent. Because the metal composition of the present invention can be applied to an inkjet method capable of easily manufacturing large electron emission element elements, large electron emission elements can be manufactured at low cost and the manufacturing process can be simplified. Image display apparatuses can also be manufactured through simplified process.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for making an electron emission element comprising a conductive film for emitting electrons, the method comprising the steps of:

providing a metal composition comprising a vinylpyrrolidone-acrylic acid copolymer represented by formula (I) on a substrate; and baking the metal composition, (I)

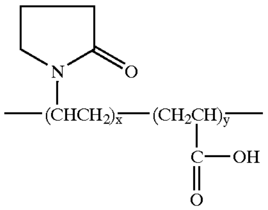

wherein x and y are integers.

2. A method for making an electron emission element comprising a pair of electrodes opposing each other, and a conductive film disposed between the pair of electrodes, the method comprising the steps of:

providing a metal composition comprising a vinylpyrrolidone-acrylic acid copolymer represented by formula (I) on a region between the pair of electrodes disposed on the substrate; and baking the metal composition, (I)

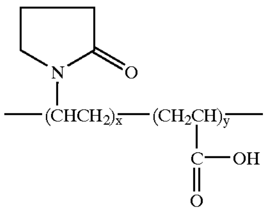

wherein x and y are integers.

3. The method for making the electron emission element according to one of claims 1 and 2, wherein the vinylpyrrolidone-acrylic acid copolymer contains 50 weight percent or more of the vinylpyrrolidone monomer unit.

4. The method for making the electron emission element according to one of claims 1 and 2, wherein the vinylpyrrolidone-acrylic acid copolymer has an average molecular weight of 30,000 or more.

5. The method for making the electron emission element according to one of claims 1 and 2, wherein the metal composition contains 0.005 weight percent or more of the vinylpyrrolidone-acrylic acid copolymer.

6. The method for making the electron emission element according to one of claims 1 and 2, the metal composition further comprising a metal compound of a platinum group element.

7. The method for making the electron emission element according to one of claims 1 and 2, the metal composition further comprising a water-soluble polyhydric alcohol.

8. The method for making the electron emission element according to one of claims 1 and 2, the metal composition further comprising a monohydric alcohol.

9. The method for making the electron emission element according to one of claims 1 and 2, wherein the step of providing the metal composition comprises providing a droplet of metal composition.

10. The method for making the electron emission element according to claim 9, wherein the droplet is provided by an inkjet method.

11. A method for making an image forming apparatus comprising an electron emission element and an image forming unit for forming images by electron irradiation, wherein the electron emission element is made by a method according to one of claims 1 and 2.

* * * * *

UNITED STATES PATENT AND TRADEMARK OFFICE

CERTIFICATE OF CORRECTION

PATENT NO. : 6,630,556 B2 Page 1 of 1
DATED : October 7, 2003
INVENTOR(S) : Yasuko Tomida et al.

It is certified that error appears in the above-identified patent and that said Letters Patent is hereby corrected as shown below:

Column 1,
Line 30, “Fonstad:“IEEE” should read -- Fonstad: “IEEE --.

Column 6,
Line 43, “$In_2O_3$—$SnO_2$;” should read -- $In_2O_3$–$SnO_2$, --.

Column 7,
Line 20, “destruct” should read -- destroy --.

Column 9,
Line 25, “of,” should read -- of --.

Column 13,
Line 57, “element elements,” should read -- elements, --.

Signed and Sealed this

Twenty-second Day of June, 2004

Jon W. Dudas

JON W. DUDAS
*Acting Director of the United States Patent and Trademark Office*